March 21, 1950 H. C. KUHLMANN 2,501,225
PORTABLE LEVER OPERATED TIRE BEAD LOOSENER
Filed June 18, 1945
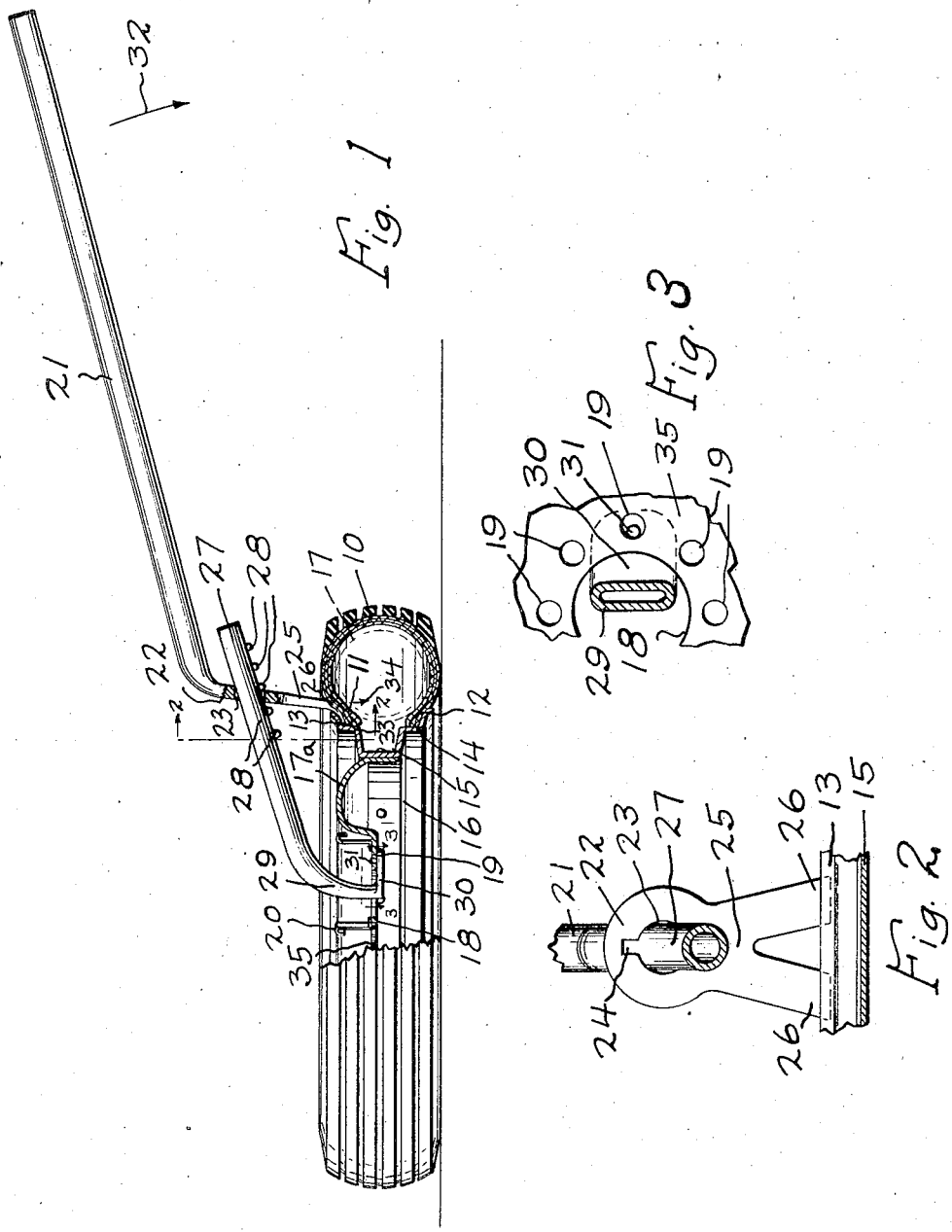
INVENTOR.
Henry C. Kuhlmann
BY
Sam J. Slotsky
ATTORNEY Patented Mar. 21, 1950

2,501,225

UNITED STATES PATENT OFFICE 2,501,225

PORTABLE LEVER OPERATED TIRE BEAD LOOSENER

Henry C. Kuhlmann, Sioux City, Iowa

Application June 18, 1945, Serial No. 600,083

1 Claim. (Cl. 157—1.17)

My invention relates to a tire tool.

An object of my invention is to provide a tire bead loosener which will effectively loosen and remove the tire bead from a rim.

A further object of my invention is to provide a tool of this character which includes a maximum amount of leverage with such leverage being applied directly and downwardly against the bead.

A further object of my invention is to provide a tool of this character which can be readily adjusted to rims of various diameters and which can be quickly manipulated from one side of the rim and then from the other when loosening both beads of a tire from the rim.

A further object of my invention is to provide a tool of this character which is positive in operation in that it can not slip out of place during the bead loosening operation.

A further object of my invention is to provide the aforementioned objects in a simple construction requiring very few parts and which can be manufactured at a reasonable cost.

With these and other objects in view, my invention consists in the construction, arrangement, and combination of the various parts of my device, whereby the objects contemplated are attained, as hereinafter set forth, pointed out in my claim, and illustrated in the accompanying drawings, in which:

Figure 1 is a side elevation of the tool as applied against a tire bead,

Figure 2 is a sectional detail taken along the lines 2—2 of Figure 1, and

Figure 3 is a section detail taken along the lines 3—3 of Figure 1.

My invention contemplates the provision of a tool for removing tire beads from rims, such beads commonly being firmly adherent to the rim, whereby it is necessary to apply sufficient force in the correct direction to remove or loosen the bead before the tire casing is removed, and to loosen both beads at either side of the casing. My invention also contemplates the provision of such a tool without requiring supporting brackets etc., and whereby the casing can be removed on the floor.

I have used the character 10 to designate a tire casing having the respective annular beads 11 and 12 which are normally received within the angled flanges 13 and 14 which extend from the well 15 of the rim 16. The inner tube 17 has been shown in dotted lines so as not to confuse the structure. The rim 16 further includes the pressed metal inner portion 17a and the central opening 18 around which are spaced the usual bolt holes 19, and attached within the member 17a are the hub cap retaining clips 20.

The tool of my invention comprises a lengthened bar 21 which can be made of a hollow pipe or any other form, which bar 21 extends into the downwardly projecting portion 22 which includes an opening 23 having an upper slot at 24, and the portion 22 extends into the further portion 25 which terminates in the pair of arcuate prongs 26 which prongs are adapted to slide or be forced between the flanges 13 or 14 and the tire beads 11 or 12.

Received through the opening 23 is a further pipe member 27 to which is attached a series of spaced projecting lugs 28, and formed integrally with the pipe member 27 is the downwardly extending portion 29 which is bent into the horizontal flattened portion 30 to which is attached a small extending pin or lug 31. The pipe member 27 is normally received rather loosely in the opening 23.

The device is operated in the following manner. The air is first released from the tube, and the flat member 30 is placed through the central opening 18 of the rim with the pin or lug 31 projecting up through one of the openings 19. The curved prongs 26 are then started between the flange 13 and the bead 11. The bar 21 is then forced downwardly at the end thereof in the direction of the arrow 32. The engagement of the member 30 and the lug 31 in the manner explained, provides a firm anchor at the end of the tool, and as the bar 21 is forced downwardly the prongs 26 will first be forced firmly between the flange 13 and the bead 11, and then down, the continued downward movement of the bar 21 causing the lower convex sides of the curved prongs 26 to force the bead downwardly as the lower edges of the prongs also slide along the portion 33 of the retaining flange.

As a result of the firm anchoring effect of the lower end of the tool and the pronounced leverage the bead will be forced away from its position and downwardly in the direction of the arrow 34. It will then be noted that one of the lugs 28 during this operation maintains the two portions 21 and 27 against relative slidable movement. These spaced lugs also permit the use of the tool on any diameter rim, the proper adjustment being made beforehand by simply rotating the member 27 180° so that the lugs will pass through the open slot 24 until the correct spacing is made. In most rims the flange 35 which includes the central opening 18 is closer to one of the bead retaining flanges than the other. For instance, as shown in the drawings this flange is closer to the bead retaining flange 13 than the flange 14. In such cases when the other bead 12 is removed, the rim is turned over and the same operation is performed by merely adjusting the member 27 so that the next higher lug 28 will bear against the portion 22 since in this operation there will be a correspondingly greater distance between the flange 14 and the central opening 18.

In this manner the tool can be adjusted to any condition requiring longer or shorter spacing, etc.

It will now be seen that I have provided the various advantages mentioned in the objects of my invention with further other advantages being readily apparent.

Some changes may be made in the construction and arrangement of the parts of my invention without departing from the real spirit and purpose of my invention, and it is my intention to cover by my claim any modified forms of structure or use of mechanical equivalents which may be reasonably included within their scope.

I claim as my invention:

A portable tire bead loosener comprising an anchor member and an extended lever operatively engaged therewith, said anchor member comprising a rod with a bent end portion and a flange extending at right angles from said bent end portion, said flange being adapted to be passed through the central opening of a wheel and engage the underside thereof, a lug on said flange for the engagement with any one of a series of bolt holes surrounding the central opening of said wheel, said anchor rod having longitudinally spaced lugs thereon, said extended lever including a tire bead engaging portion, said bead engaging portion including a pair of arcuate prongs receivable between the bead flange of said wheel and the tire bead, said extended lever having an opening for receiving said anchor rod, said spaced lugs pivotally and adjustably retaining said extended lever at a selected distance from the bent end portion of said anchor rod, whereby downward pivotal movement of said extended lever will force said prongs between said bead flange and said tire bead, said extended lever having an open slot contiguous with said opening whereby rotation of said anchor member will provide passage of said lugs therethrough for desired spaced positioning of the anchor member with respect to the extended lever.

HENRY C. KUHLMANN.

REFERENCES CITED

The following references are of record in the file of this patent:

UNITED STATES PATENTS

| Number | Name | Date |
|---|---|---|
| 1,001,670 | Morris | Aug. 29, 1911 |
| 1,208,184 | Mayer | Dec. 12, 1916 |
| 1,211,571 | Goodrich | Jan. 1, 1917 |
| 1,567,276 | Kowalzcyk et al. | Dec. 29, 1925 |
| 2,217,139 | Smith | Oct. 8, 1940 |
| 2,241,886 | Pearce et al. | May 13, 1941 |
| 2,305,886 | Mahler | Dec. 22, 1942 |
| 2,340,586 | Freed | Feb. 1, 1944 |